Figure 1:
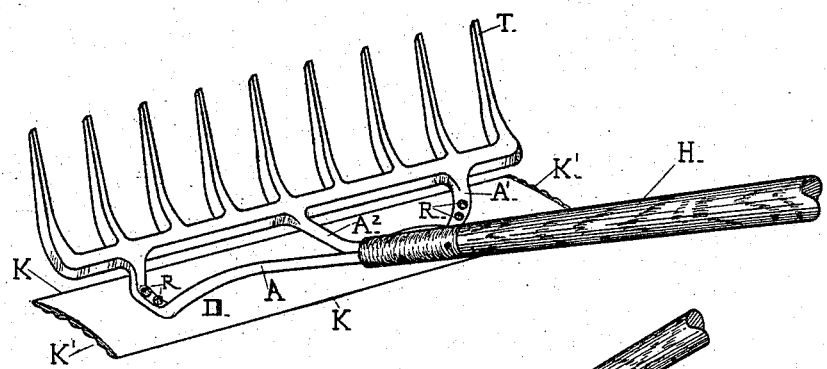

(No Model.)

W. D. HUNTINGTON.
AGRICULTURAL HAND TOOL.

No. 571,371. Patented Nov. 17, 1896.

WITNESSES
Henry O. Westendarp
John W. Gibboney

INVENTOR
William D. Huntington

UNITED STATES PATENT OFFICE.

WILLIAM D. HUNTINGTON, OF LYNN, MASSACHUSETTS.

AGRICULTURAL HAND-TOOL.

SPECIFICATION forming part of Letters Patent No. 571,371, dated November 17, 1896.

Application filed October 19, 1894. Serial No. 526,391. (No model.)

*To all whom it may concern:*

Be it known that I, WILLIAM D. HUNTINGTON, a citizen of the United States, and a resident of Lynn, in the county of Essex and Commonwealth of Massachusetts, have invented certain new and useful Improvements in Agricultural Tools, of which the following is a description.

My invention relates to improvements in agricultural hand-tools used in weeding, grading, and mellowing the soil and clearing it of rubbish, and its object is to produce a tool which shall combine in a single implement a construction adapted to the different uses of raking the soil, mellowing the soil, grading it, clearing it of weeds and rubbish, &c. In the instrument of my invention there are combined, therefore, the functions of a rake and a "shuffle-hoe"—that is, a hoe adapted to be operated by either a pushing or pulling motion and having a number of working edges.

The advantages of my invention are that a single instrument replaces the two which were formerly necessary to be used in doing the classes of work above mentioned, and the implement of the invention is cheaper to manufacture than the two separate instruments heretofore used in doing the same work. It is very often desirable and indeed necessary in working earth or sward to use a rake and shuffle-hoe in frequent alternation in order to make rapid progress, and heretofore this has required the use of two separate instruments, one of which was required to be laid down and the other picked up, and of course this necessitated the walking from the point where one instrument was last used to where the other had been placed. I avoid all this loss of time in my invention by combining these implements in a novel manner, so that according to the character of the work either the one or the other may be used, as desired. My invention also effects a great economy in manufacture, for it costs little more to make this combined implement than either one of the single implements heretofore used in its stead, to wit, a rake and shuffle-hoe, and thus it supplies a want for such tools at a less price than before.

My invention consists in securing to the arms on the back side of a rake (which arms are bent as hereinafter described) a flat or approximately flat blade of steel, which blade may be riveted, bolted, or otherwise fastened to these arms in such manner that either its forward or backward edge, respectively, may be used as the active cutting edge, as desired, the forward edge with a given angle of inclination of the handle and a pushing motion and the backward edge with a different angle of inclination of the handle and a pulling action, while the construction is such as affords a maximum strength and durability in the implement together with an increased economy in its manufacture; also, if desired, the two end edges may likewise constitute active cutting edges, as will be hereinafter brought out.

My invention consists also in certain specific improvements in shuffle-hoes, which will be described and then claimed herein.

Figure 2:
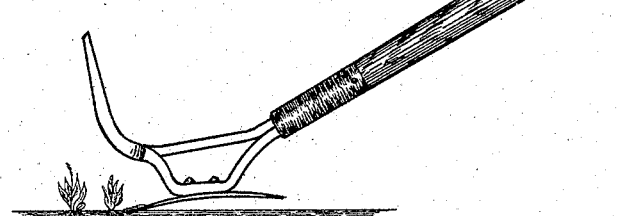
Figure 3:
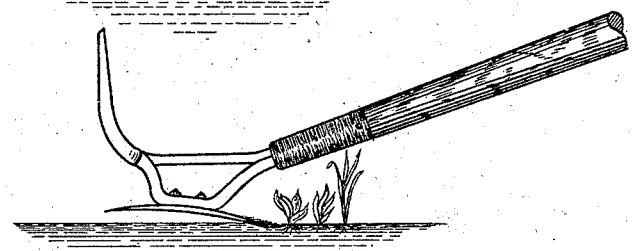
Figure 4:
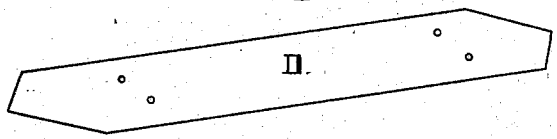
Figure 5:
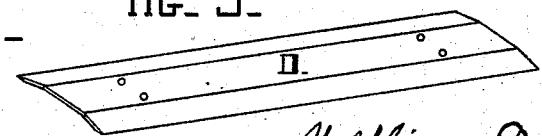

Figure 1 is a perspective view of the implement of my invention. Figs. 2 and 3 show some of its positions in operation. Figs. 3 and 4 show details of specific improvements.

In Fig. 1, T are the teeth of an ordinary steel rake. In my invention the arms of the rake A A' A², two or more, depending upon the width of the implement, are preferably made integral with the body portion, as by stamping the whole from a piece of sheet-steel, and are bent backward to afford support for the blade D. Thus in the figure the arms A A' are each bent backward, then forward at a predetermined angle, and afterward are bent in any suitable manner to admit of their entering the end of the handle H.

In case the implement is very wide I prefer also to use a third arm A², extending from the middle of the rake directly to the handle H without bending backward to the blade D, to brace the parts and make the implement stronger. The position of this arm A³ is more clearly seen in Figs. 2 and 3. The blade D of the shuffle-hoe is directly attached, as by riveting, to these arms A A', and, as stated, the angle of attachment is so selected that either the forward edge or the backward edge of the blade D may be used in the manner shown in Figs. 2 and 3—that is, by changing the angle of inclination of the handle H and using a pushing or pulling cut, as the case may be. By thus directly attaching the blade of the shuffle-hoe to the arms of the rake, which arms have been bent to the rear, as described, I secure a rigid and durable construction, as the attachment of the blade is made by a number of rivets, and as will be seen by an inspection of Fig. 3 the direction of pressure in pulling or pushing the implement in its use as a shuffle-hoe, during which use it is subject to the greatest strains, is nearly in line with the center of the blade, where it is attached to the arms, and the arms are therefore not so apt to be bent or broken in heavy work as they are in the older types of such tools with which I am acquainted.

Simply giving the implement half a revolution permits its being used as a rake or as a shuffle-hoe, and the addition of the weight of the blade D is insignificant and does not at all interfere with the proper and easy use of the implement in either position of working.

The second part of my invention concerns the shape and contour of the blade of the shuffle-hoe itself.

For particular classes of work I serrate the ends of the blade D, as shown in Fig. 1, and sharpen these edges so that they become exceedingly effective in making a lateral cut, as is required, for instance, in removing weeds close to the edges of walks or gardens, and these serrations constitute a part of my present improvements. In lieu of the serrations shown in Fig 1 the ends of the blade D may be made V-shaped, as shown in Fig. 4, and while this is not so effective as the serrations the edges are of course more easily resharpened than are the small serrations shown in Fig. 1. The implement of my invention may be constructed of various sizes, as determined by the nature of the work, but from nine inches to fifteen inches width of rake and a somewhat greater width of the blade D, so as to admit of the end edges being used, will be found to meet the ordinary requirements.

I am aware that it has been proposed to make a combined rake and hoe, but in all such attempts the hoe has been attached to the back of the rake-head, whereas in my construction the hoe is fastened to the downwardly-bent braces which connect the rake-head with the handle. This brings the hoe into a better position for work, and also permits it to be seen more easily and thus facilitates the use of it.

Having thus described my invention, what I claim, and desire to secure by Letters Patent, is—

1. An agricultural hand-tool, comprising a rake having teeth, arms connected therewith and bent downwardly, then horizontally, and thence upwardly and rearwardly to a common handle, and a shuffle-hoe blade secured to the horizontal portions of said arms, substantially as described.

2. An agricultural hand-tool, comprising a rake having working teeth and arms for support in a handle all stamped from a single piece of metal, said arms extending downwardly, then horizontally and thence upwardly and rearwardly, and united with a central straight brace to form a common tang, and a shuffle-hoe blade attached to the horizontal portions of the arms on the side opposite to the rake-teeth, substantially as described.

Signed at Lynn, Massachusetts, this 15th day of October, 1894.

WILLIAM D. HUNTINGTON.

Witnesses:
JOHN W. GIBBONEY,
WILLIAM P. CONWAY.